United States Patent [19]

Hackett

[11] 4,035,798

[45] July 12, 1977

[54] ULTRASONIC INTRUSION DETECTION SYSTEM

[75] Inventor: Kenneth R. Hackett, Boulder, Colo.

[73] Assignee: Pittway Corporation, Northbrook, Ill.

[21] Appl. No.: 652,049

[22] Filed: Jan. 26, 1976

Related U.S. Application Data

[63] Continuation-in-part of Ser. No. 455,260, March 27, 1974, Pat. No. 3,942,178.

[51] Int. Cl.² .................... G01S 9/42; G01S 9/66; G08B 13/00
[52] U.S. Cl. .......................... 343/5 PD; 340/258 A
[58] Field of Search ............. 340/258 A; 343/5 PD

[56] References Cited

U.S. PATENT DOCUMENTS

| 3,696,417 | 10/1972 | Pedersen | 343/5 PD X |
| 3,760,400 | 9/1973 | Galvin et al. | 340/258 A |
| 3,781,773 | 12/1973 | Ravas | 340/258 A X |
| 3,796,989 | 3/1974 | Ravas et al. | 340/258 A X |

Primary Examiner—Malcolm F. Hubler
Attorney, Agent, or Firm—Charles E. Pfund

[57] ABSTRACT

An ultrasonic or microwave intrusion detection system uses a modulated transmitter having one or more transducers or antennas for maintaining wave fields in the area to be protected and a receiver fed by one or more transducers or antennas which detect echo reflections of the energy from within the area. The receiver employs two mixers energized to be mixed with the echo signals and a portion of the energy from the transmitter, one of the mixers receiving such transmitter energy with 90° phase shift relative to the other mixer. The outputs of the two mixers thus are in quadrature phase relative to each other and define a rotating vector which contains the information relating to the echo signals. The modulation product of these quadrature signals obtained by multiplying them together is processed continuously at the modulation frequency to obtain more reliable target information in the presence of substantially larger clutter return signals and other interference.

12 Claims, 4 Drawing Figures

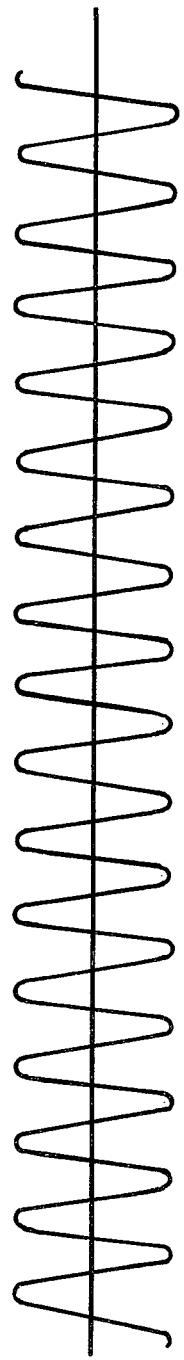
FIG. 4

ULTRASONIC INTRUSION DETECTION SYSTEM

CROSS-REFERENCE TO RELATED APPLICATION

This application is a continuation-in-part of my co-pending application Ser. No. 455,260, filed Mar. 27, 1974 now U.S. Pat. No. 3,942,178.

BACKGROUND OF THE INVENTION

The object of this invention is to reduce the sensitivity of an ultrasonic intrusion detection system to ambient noises and yet maintain the sensitivity to moving targets. Bells and escaping compressed air or steam can produce ultrasonic components which fall within the normal range of doppler frequencies and, hence, are confused for moving targets thus creating false alarms.

In my pending patent application, U.S. Ser. No. 455,260, filed on Mar. 27, 1974, I describe a method for reducing the sensitivity to random to and fro motion and for ambient noise which is symmetrical about the transmitting frequency. That system, however, is sensitive to interference which is unsymmetrical about the transmitting frequency since that is the characteristic being sought from a moving target. An unsymmetrical interference spectrum is for example often created by the harmonics of a telephone bell.

THE PRESENT INVENTION

In this invention, the transmitter is modulated by keying it on and off at a controlled rate. The returning doppler shifted echo has the same modulation envelope so it can be identified as ultrasound which originated from the transmitter and not as ultrasound from some source of interference. This is achieved in the receiver by selecting a modulation component or sideband as the signal which is integrated to produce an alarm.

BRIEF DESCRIPTION OF THE DRAWINGS

FIGS. 2, 3 and 4 show wave forms useful in describing the operation.

DESCRIPTION OF THE PREFERRED EMBODIMENT

Figure 2:
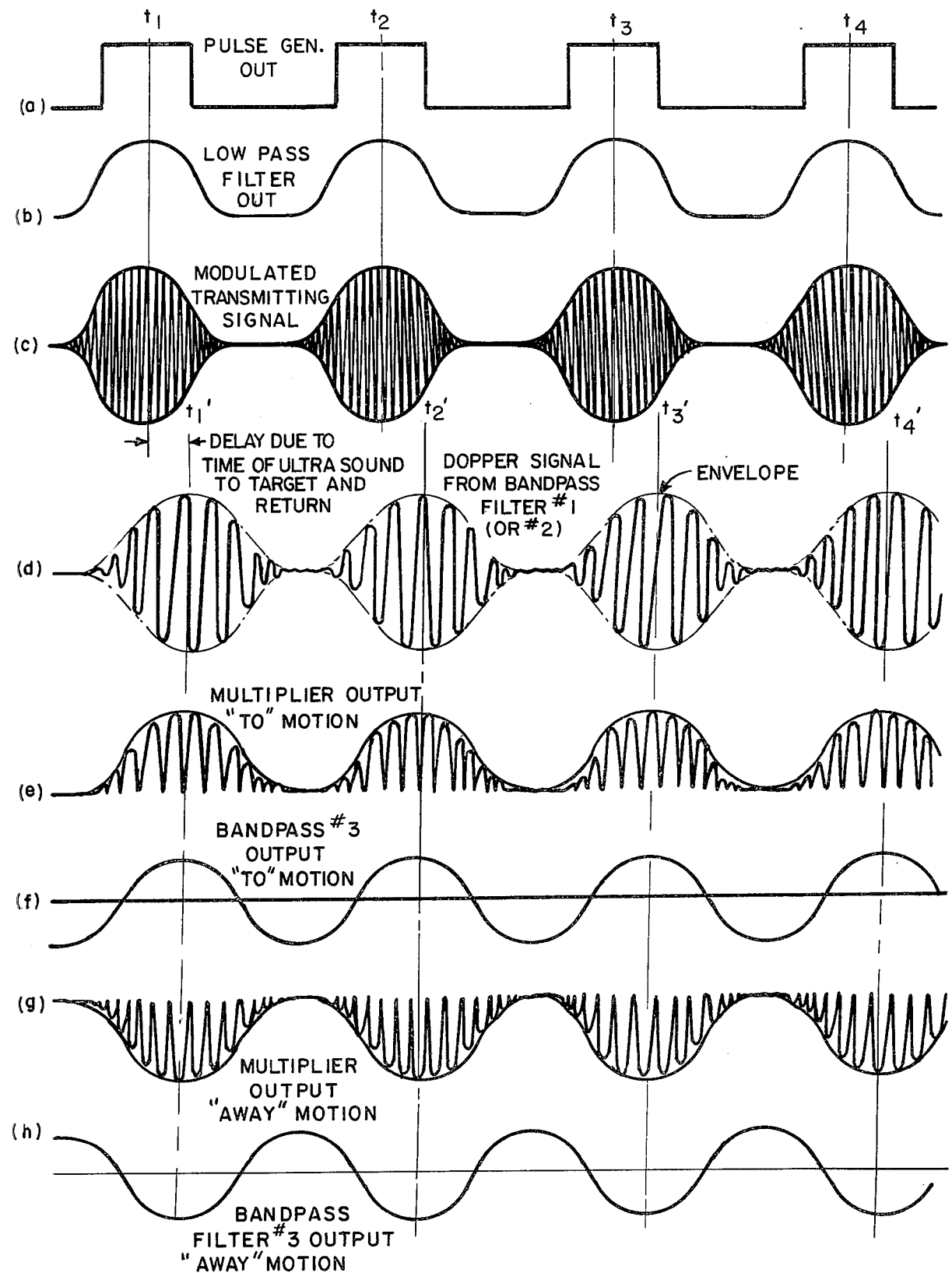

The pulse generator 11 generates a train of rectangular pulses, FIG. 2a, which are then band limited by the low pass filter 12 as shown in FIG. 2b, to attenuate the harmonics so they will not extend up and into the doppler band of frequencies and cause interference. Thus there is a gradual rise and fall and a substantial period of zero amplitude between pulses in the modulation waveform FIG. 2b.

The ultrasonic transmitting frequency from the oscillator 13 is modulated in modulator 14 by the band limited pulse, FIG. 2c, and fed to the transmitting transducer 16 via the output amplifier 15. Since the amplitude of the modulated wave, FIG. 2c, is substantially zero between pulses, the transmitted wave has a high effective index of modulation.

The receiving transducer 21 picks up the reflected modulated signal which returns from the target after a time delay corresponding to the distance to the reflecting target or other reflector surface. The signal is then amplified at 22 and detected by the quadrature detectors 23, 24 as described in copending application Ser. No. 455,260, now U.S. Pat. No. 3,942,178 the disclosure of which is incorporated by reference with the transmitting frequency from the oscillator 13 is used for detection to obtain beat frequency signals. The signals from the quadrature detectors 23, 24 pass through band pass amplifiers 25 and 26 as the Doppler frequency modulated as shown in FIG. 2d. Due to multiple reflections which will always be present in a practical situation the return signal envelope is spread somewhat in time but still retains the substantially zero level modulation between pulses due to the pulse modulation waveform FIG. 2b. Thus the modulation index (ratio of signal maximum to minimum) remains comparable to that of the transmitted signal FIG. 2c.

The differentiator 30, limiter 27 and multiplier 28 are used to determine the direction of target motion as described in my application Ser. No. 455,260, now U.S. Pat. No. 3,942,178. In echo signal systems generally and intrusion alarm systems in particular the dynamic range of signals encountered is extremely large and the presence of large signals results at times in exceeding the dynamic range of electronic channels which include amplifiers, differentiators and multipliers and similar components. The processing of signals which are squared accentuates this problem and can result in a system which is capable of handling only signals within a limited amplitude range. Conversely, if the signal information could be processed with only the first power of the amplitude quantities requiring operational conversion, such as differentiation and multiplication, improved results can be obtained in that wider dynamic signal range can be accommodated and the system is not susceptible to being by high amplitude signals. At the same time it is important that the improved processing be obtained with full utilization of the information content of the signals since the difficult discrimination between the true signal and clutter return must nevertheless be achieved with signals deeply buried in the clutter signals.

Figure 1:
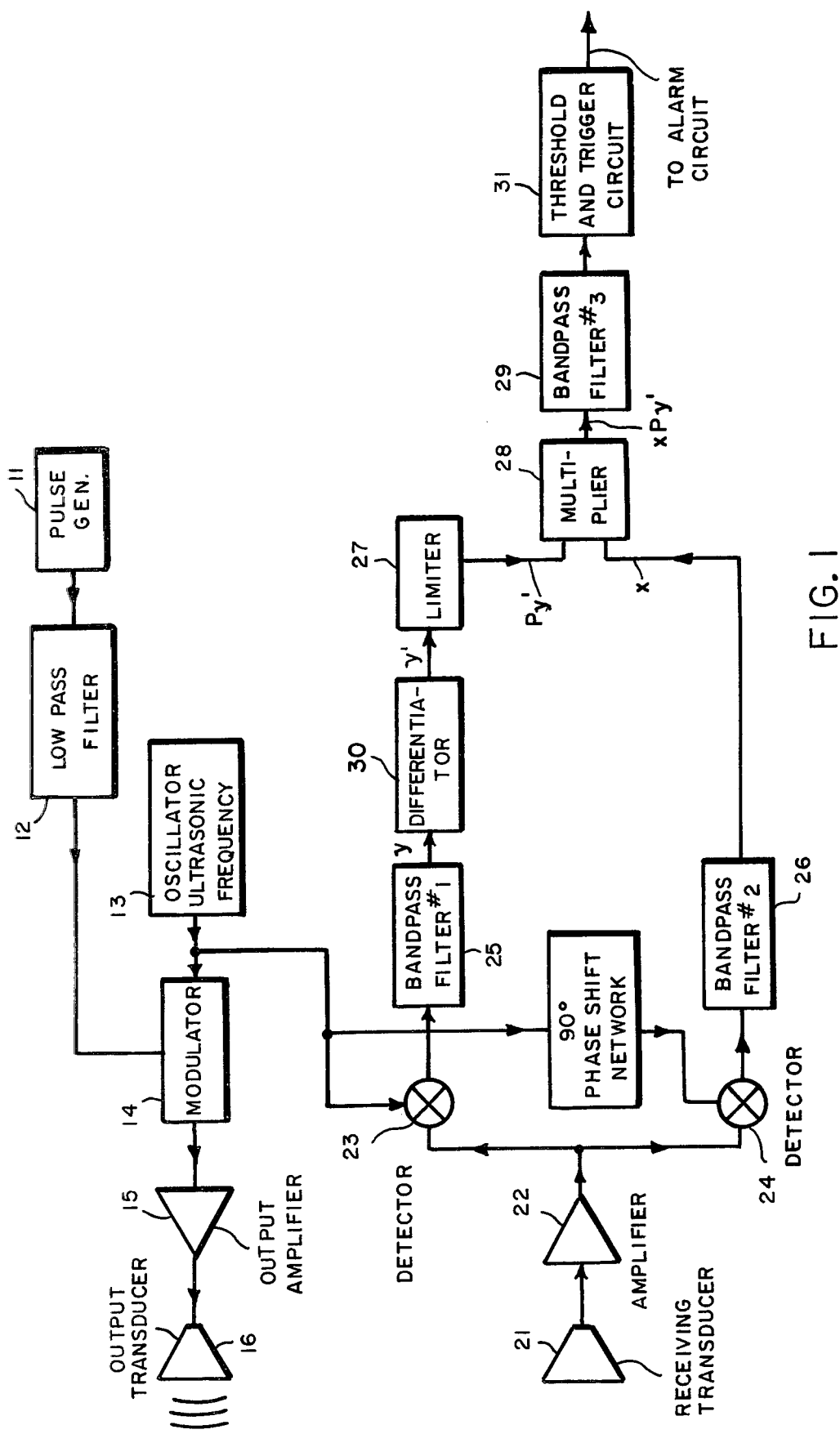
FIG. 1 shows a block diagram of a system generally corresponding to the systems disclosed in Ser. No. 455,260 but with rectangular wave modulation of the transmitted energy and associated circuit elements in accordance with this invention.

The system of FIG. 1 achieves the operation and advantages just described by processing signals with the amplitude information removed from the differentiated signal component. Thus multiplier 28 produces the product of input signal $x$ and a quantity $Py'$ which is the quantity $y'$ having the polarity of the $y'$ signal but with normalized or unit amplitude constant throughout the period during which $y'$ remains at each polarity. The system of FIG. 1 applies the $x$ input to multiplier 28 while the $y$ input is differentiated in differentiator 26 to apply $y'$ to limiter 27 which applies $Py'$ to the multiplier 28. The bandpass filter 29 thus receives the quantity $xPy'$. Since all of the amplitude information is available in the $x$ and $y$ input signals no essential information is lost in obtaining the product $xPy'$. On the contrary, the advantages of processing the amplitude of the signal as the first power thereof while maintaining the polarity as obtained with four quadrant multiplication is achieved by the simple expedient of differentiating the $y$ wave and limiting its amplitude value. Although the limiting function can be obtained with infinite gain amplification, "soft" limiting may be employed to provide some dynamic response to the product $xy'$ for low level signals with the limiter providing a hard limiting polarity-only signal for larger magnitude echo returns. "To" motion produces a series of positive half sine waves from the multiplier and has a modulation envelope similar to the transmitter output, FIG. 2e. The frequency of this envelope is exactly equal to the output modulating frequency. It is delayed because of the transit time to the target and back. It is also broader in time because of multiple sound paths to the target and back.

The signal from the multiplier 28 is fed to bandpass filter 29 which has a very narrow bandwidth (i.e., high Q) centered on the output modulating frequency. Because of the high Q, the output response of bandpass filter 29 has a slow rise time. It selects this frequency component from the multiplier 28, FIG. 2f, and feeds it to the threshold and trigger circuit 31. If the signal is strong enough, the trigger circuit 31 generates an alarm signal.

If the target moves away from the system, a series of negative half sine waves is generated by the multiplier 28, FIG. 2g, also having a modulation envelope similar to the transmitted modulation envelope. Bandpass filter 29 selects this frequency component, FIG. 2h, and feeds it to the threshold and trigger circuit 31. The signal from bandpass filter 29 is 180° out of phase when the motion is "away" as compared to "to" motion.

Bandpass filter 29 functions as an integrator because of its narrow bandwidth. When "to" motion begins, FIG. 3a, it takes several cycles FIG. 3b, for the output to build up to full amplitude. When there is an interferring signal FIG. 3c, the multiplier output has a random envelope and is not related to the transmitting modulation frequency. Thus bandpass filter 29 only produces a small spurious output FIG. 3d, because there is little energy at its center frequency.

Figure 3:
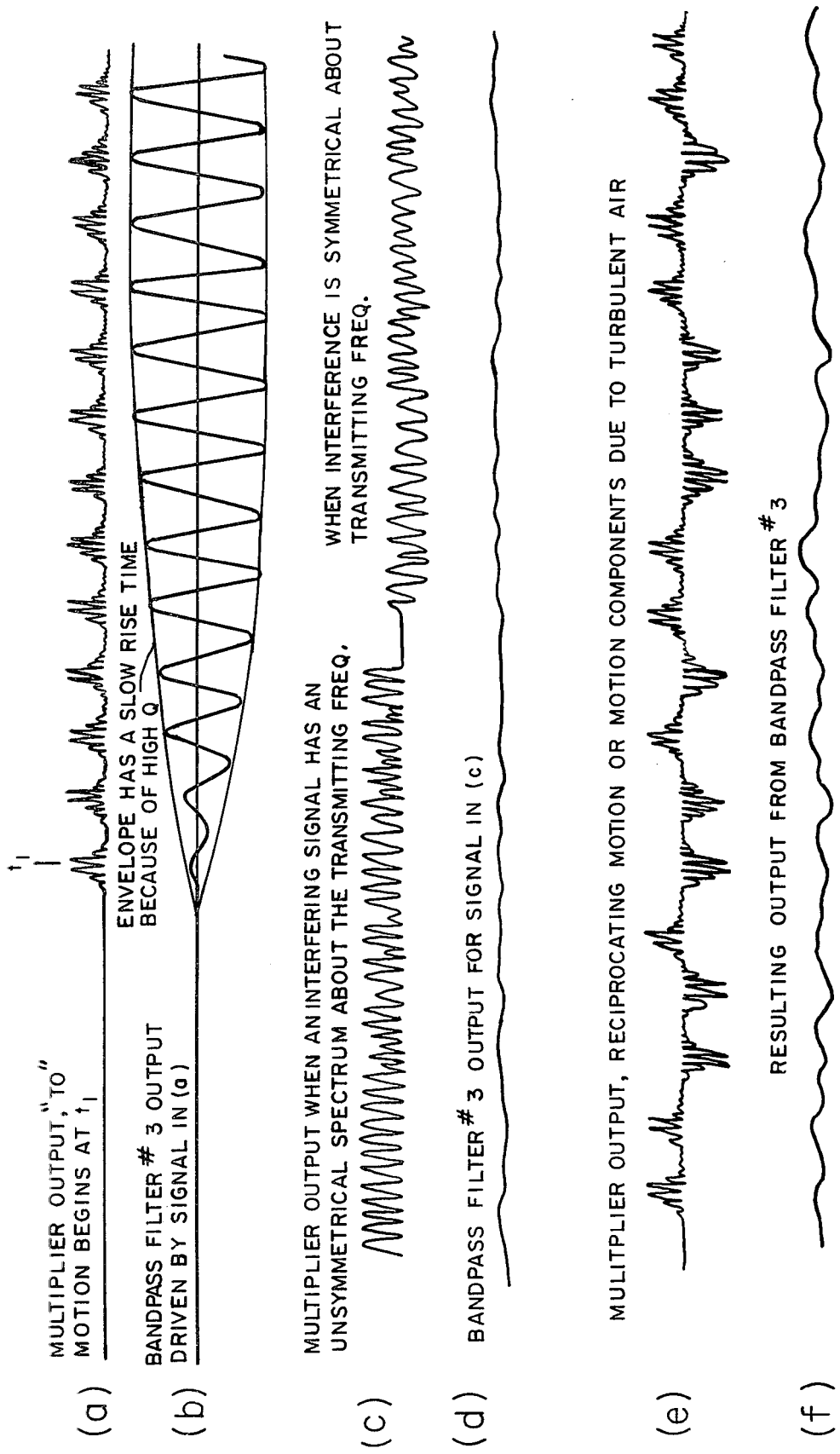

When there is reciprocating motion or random back and forth motion, the multiplier 28 produces a sequence of positive and negative half sine waves FIG. 3e, each with the same modulation envelope as the transmitted signal. Because of the response time of bandpass filter 29, its output does not build up to a level to exceed the threshold and indicate an alarm, FIG. 3f.

In an alarm system, it is necessary for the system to be sensitive to intruders in the presence of interferring signals. In FIG. 4a, the multiplier 28 is producing an output which results from an interferring signal and a moving target occurring simultaneously. The modulation envelope from the moving target is discernable and it is selected by bandpass filter 29, FIG. 4b. This occurs also if ambient noise, random motion and a continuously moving target occur simultaneously. The system is sensitive to a moving target but insensitive to ambient noise and random motion components.

A typical ultrasonic frequency is 26.5 KHz and a typical modulating frequency is 4 Hz which is also the center frequency of bandpass filter 29. Although a single transmitting and receiving transducer pair are shown, this processing can operate in a multiple transducer system. Selective intruder detection for multiple protected areas can be achieved by distinctive modulation frequency or characteristic for each area.

I claim:

1. The method of detecting moving target echos in the presence of interference comprising the steps of radiating modulated carrier energy and receiving echo return energy, hetrodyning carrier and received energy signals to produce separate quadrature beat frequency signals, differentiating and amplitude limiting one of said beat frequency signals, multiplying the differentiated and limited signal and the other beat frequency signal to obtain the four quadrant product of the signals multiplied, selecting a modulation component from said product and integrating said modulation component.

2. The method according to claim 1 which includes the steps of radiating modulated carrier energy of different modulation frequency into respective multiple protected areas and selecting the modulation frequency component for each area to selectively detect intruders in the respective areas.

3. In an echo signal intrusion alarm system having enhanced detection capability for return echos from a moving object in the presence of interference and clutter return comprising:
   means for radiating a modulated carrier signal into a protected zone;
   means for detecting reflected signals from said zone, including first and second quadrature mixing means for mixing signals corresponding to the carrier and received signals to produce quadrature output signals in accordance with the beat frequency between said transmitted and received signals;
   means for multiplying one of said quadrature output signals by a factor obtained from the time derivative of the other quadrature output signal to obtain the four-quadrant product of the signal and factor multiplied;
   limiter means operative on said time derivative to obtain said factor for making said four-quadrant product proportional to the amplitude of only said one of said quadrature output signals;
   means for selecting a modulation component from said product;
   integrating means responsive to said modulation component for cancelling opposite polarity signal components corresponding to said interference and clutter return and accumulating an integrated signal magnitude from modulation components of the same polarity corresponding to a given direction of motion for said moving object; and
   means responsive to a predetermined accumulated level of said integrated signal magnitude for producing an alarm signal.

4. An ultrasonic intrusion alarm system having enhanced detection capability for return echos from a moving object in the presence of interference and clutter return signals comprising:
   a carrier frequency source of ultrasonic signal;
   means for amplitude modulating said ultrasonic signal with a periodic wave to produce a modulated carrier;
   means for transmitting ultrasonic energy corresponding to said modulated carrier into a protected zone;
   means for receiving ultrasonic energy from said zone including reflected modulated carrier energy to produce corresponding received signals;
   first and second quadrature mixing means for mixing said received signals and said carrier frequency to produce quadrature output signals in accordance with the beat frequencies between the transmitted and received ultrasonic energy;
   filter means coupled to the outputs of each said mixing means for selecting Doppler frequency band signals;
   means for differentiating the signal output of one of said filter means;
   limiting means for limiting the differentiated signal output of said one filter means;

means for multiplying the output of said limiting means and the signal output of the other said filter means to produce a product signal;

means for selecting a modulation component from said product signal and integrating said modulation component for cancelling opposite polarity signal components corresponding to said interference and clutter return and accumulating an integrated signal magnitude from modulation components of the same polarity corresponding to a given direction of motion for said moving object; and means responsive to a predetermined accumulated level of said integrated signal magnitude for producing an alarm signal.

5. Apparatus according to claim 4 wherein said means for modulating includes means for modulating said ultrasonic signal with a periodic wave to produce a modulated carrier which gradually varies between successive maximum values with an interval of substantially zero amplitude therebetween.

6. Apparatus according to claim 5 wherein said limiting means has a dynamic response to low level signals and hard limits to provide polarity-only signal response for high level signals.

7. Apparatus according to claim 6 wherein said means for multiplying produces a four-quadrant product of the input signals multiplied.

8. Apparatus according to claim 7 wherein said means for selecting a modulation component comprises a high-Q bandpass filter centered at the frequency of said periodic wave.

9. Apparatus according to claim 8 wherein said carrier frequency is of the order of 26.5kHz and the frequency of said periodic wave is of the order of 4Hz.

10. Apparatus according to claim 4 wherein said means for multiplying produces a four-quadrant product of the input signals multiplied.

11. Apparatus according to claim 5 wherein said means for multiplying produces a four-quadrant product of the input signals multiplied.

12. Apparatus according to claim 4 wherein said limiting means has a dynamic response to low level signals and hard limits to provide polarity-only signal response for high level signals.

* * * * *